United States Patent [19]

Kadomaru et al.

[11] Patent Number: 5,618,869
[45] Date of Patent: Apr. 8, 1997

[54] RUBBER COMPOSITION FOR TREADS OF STUDLESS TIRES

[75] Inventors: Kazuo Kadomaru, Kobe; Yoichi Mizuno, Akashi, both of Japan

[73] Assignee: Sumitomo Rubber Industries, Ltd., Hyogo, Japan

[21] Appl. No.: 575,170

[22] Filed: Dec. 19, 1995

[30] Foreign Application Priority Data

Dec. 19, 1994 [JP] Japan .................................. 6-315186

[51] Int. Cl.$^6$ ........................................................ C08K 5/24
[52] U.S. Cl. ..................... 524/261; 524/262; 524/263; 524/265; 524/267; 523/212; 523/213; 525/191
[58] Field of Search .................................. 524/261, 262, 524/263, 265, 267; 523/212, 213; 525/191

[56] References Cited

U.S. PATENT DOCUMENTS 2,690,461  9/1954  Steeves .................................. 260/729

FOREIGN PATENT DOCUMENTS

| 0265070 | 4/1988 | European Pat. Off. . |
| 0641824 | 3/1995 | European Pat. Off. . |
| 1120760 | 7/1956 | France . |
| 2-167353 | 6/1990 | Japan . |
| 3-159803 | 7/1991 | Japan . |
| 3-262707 | 11/1991 | Japan . |
| 5-111920 | 5/1993 | Japan . |
| 7-32809 | 2/1995 | Japan . |

OTHER PUBLICATIONS

Chemical Patents Index, Basic Abstracts Journal Week 8737, Derwent Pub. Ltd. & JP-A-62 181 346.

*Primary Examiner*—Edward J. Cain
*Attorney, Agent, or Firm*—Birch, Stewart, Kolasch & Birch, LLP

[57] ABSTRACT

A rubber composition suitable for use in tread of tires, particularly studless tires having increased digging and adhesive frictions to improve characteristics on icy roads of the tires without substantial deterioration of the durability of the tires or with minimizing the deterioration, which comprises a diene rubber component, 3 to 30 parts by weight of an ebonite powder and 0.1 to 3 parts by weight of a silylating agent, respectively, per 100 parts by weight of the rubber component.

6 Claims, No Drawings

RUBBER COMPOSITION FOR TREADS OF STUDLESS TIRES

BACKGROUND OF THE INVENTION

The present invention relates to a rubber composition suitable for use in tire treads, and more particularly to a rubber composition having excellent characteristics on icy and snow-covered roads and suitable for use in treads of studless tires.

Spiked tires which grip icy roads by spike pins, have been popularly used as pneumatic tires suitable for running on icy roads. However, the spiked tires cause dust pollution because roads are scraped off by the pins if automobiles with spiked tires are run on usual roads. The use of spiked tires is in some countries legally prohibited in order to prevent dust pollution from spiked tires. Thus, in recent years, studless tires attract attention as pneumatic tires which can grip icy roads without the use of spike pins. However, the characteristics on icy roads of studless tires are still insufficient as compared with spiked tires which directly grip icy roads by means of the spike pins. Thus, in order to improve the characteristics on icy roads of studless tires, there have been made various attempts to increase the coefficient of friction of the tread surface to icy roads.

Among frictions between a tread and a road, digging friction and adhesive friction are known as main frictions to secure the driving force and braking force. It is necessary to increase these frictions in order to improve the grip characteristics on icy roads of studless tires.

For example, it is proposed to produce the tread of studless tire from an expanded rubber, wherein it is contemplated to increase the digging friction by means of edges resulting from cells of expanded rubber and to increase the adhesive friction by the action of the edges to remove a water film formed between the tread surface and an icy road. Improvement in digging friction and adhesive friction requires increasing the proportion of cells, namely expansion ratio, but this results in softening of the tread, and in its turn brings about deterioration of stability, controllability and abrasion resistance in a non-snowy area.

Japanese Patent Publication Kokai No. 2-167353 proposes a pneumatic tire having a tread made from a rubber composition incorporated with a powdery product of a cellulose material such as chaff or wood flour. Such a cellulose powder does not form any chemical bonding with a rubber component. Thus, the cellulose powder exposed onto the surface of tread will fall off during running, and open pores resulting from falling off of the cellulose powder from the tread may contributes to increase in digging friction and adhesive friction in the same manner as cells of an expanded rubber. On the other hand, since the cellulose powder is present as an additive in the rubber before it is exposed to the tread surface and falls off therefrom, softening of the tread rubber as encountered by the expanded rubber does not occur, thus this tread rubber does not bring about deterioration of the durability in a non-snowy area.

However, the cellulose powder has many OH groups in the cellulose molecule and shows a hydrophilic property, so its hardness decreases due to absorption of water before it is exposed to the tread surface and falls off therefrom. Thus, there is a limit in increasing the digging friction by incorporation of the cellulose powder.

It is an object of the present invention to provide a rubber composition suitable for use in treads of studless tires, which has improved digging friction and adhesive friction without deteriorating the stability and controllability and the durability thereof.

A further object of the present invention is to provide a rubber composition having a good durability such as abrasion resistance and capable of exhibiting excellent grip characteristics even on an icy road.

These and other objects of the present invention will become apparent from the description hereinafter.

SUMMARY OF THE INVENTION

It has been found that the digging friction and adhesive friction of a tread rubber can be successfully improved with minimized deterioration of the durability of the tread rubber by incorporating an ebonite powder into the tread rubber, while the adhesive friction is further improved by incorporation of a silylating agent.

In accordance with the present invention, there is provided a rubber composition for a tire tread comprising a diene rubber component, 3 to 30 parts of an ebonite powder having an average particle size of not more than 100 µm and 0.1 to 3 parts of a silylating agent, said parts all being parts by weight per 100 parts by weight of said diene rubber component.

The rubber composition of the present invention is suitable for use in tire treads and provides studless tires having an excellent durability and improved grip characteristics on icy roads as well as snow covered roads to exhibit excellent acceleration and braking characteristics on icy roads.

DETAILED DESCRIPTION

Diene rubbers are used as the rubber component of the composition of the present invention without particular restriction in the kind thereof. Diene rubbers which have good low temperature characteristics are generally used, e.g. natural rubber (NR), butadiene rubber (BR), isoprene rubber (IR) and styrene-butadiene rubber (SBR). The diene rubbers may be used alone or in admixture thereof.

Ebonite is known as a hard rubber produced by adding a large amount of sulfur to a rubber such as natural rubber, styrene-butadiene rubber or nitrile rubber, e.g. 30 to 50 parts by weight of sulfur per 100 parts by weight of a rubber, and curing the rubber for a long time. Ebonite has a water repelling property. A powder of ebonite prepared from any of source rubbers can be used in the present invention.

The ebonite powder has a hardness equal to or higher than a cellulose powder, and the ebonite powder exposed to the tread surface can exhibit the digging friction on icy roads. Also, since the ebonite powder has a water repellency and serves to facilitate removal of a water film present between the tread surface and an icy road, it contributes to increase in adhesive friction on icy roads also before falling off from the tread surface. Further, since in the ebonite the unsaturated bouble bonds of a rubber are almost completely saturated by sulfur, the ebonite powder incorporated in a rubber composition does not form a chemical bonding with a matrix rubber of the composition even by the curing of the composition. Thus, the ebonite powder exposed to the tread surface can fall off therefrom during running. After the ebonite powder has fallen off, the pores formed thereby on the tread surface serve in the same manner as cells of an expanded rubber to contribute to increase in digging friction and adhesive friction. Moreover, before the ebonite powder appears at the tread surface and fails off therefrom, it can be present as an additive in the rubber without softening the tread rubber and adversely affecting the durability, even if the ebonite powder is incorporated in a rubber composition in an amount necessary and sufficient to improve the grip characteristics.

The average particle size of the ebonite powder used in the present invention is not more than 100 µm. If the particle size is more than 100 µm, the local difference in hardness of the tread surface becomes large to decrease the adhesive friction. Also, since the ebonite powder is a hard materials, the pores formed on the tread surface by falling off of the powder become too large to deteriorate the abrasion resistance. Further, incorporation of the ebonite powder having such a large particle size may deteriorate the grip characteristics on general roads and is apt to become a cause of chipping of the tread rubber. The ebonite powder having an average particle size within the range of 30 to 90 µm is usually employed in the present invention.

The ebonite powder is used in an amount of 3 to 30 parts by weight, preferably 5 to 30 parts by weight, more preferably 7 to 15 parts by weight, per 100 parts by weight of the diene rubber component. If the amount of the ebonite powder is less than 3 parts by weight, desired effects are not sufficiently exhibited. If the amount is more than 30 parts by weight, the number of ebonite particles appearing at the tread surface (the proportion of the ebonite particles in the tread surface) increases, thus resulting in increase of the pores formed by falling off thereof, to deteriorate the abrasion resistance of the tread surface.

Incorporation of the silylating agent into a rubber composition is effective for increasing the adhesive frictional force of the tire tread. The silylating agent easily reacts with compounds having an active hydrogen, such as OH group, NHR group, COOH group, CONH group or SH group, present in the rubber composition to replace the active hydrogen with a silyl group such as —$SiR_3$ group. Thus, hydrophilic groups in a tread rubber composition are decreased and changed to hydrophobic to impart a water repellency to the tread rubber, whereby sticking of water or water film onto the tread rubber surface can be restrained and water droplets sticking onto the tread rubber surface can be easily removed.

Known silylating agents which have been used in silylation of organic or inorganic compounds, namely organic silicon compounds which are capable of introducing a silyl group into organic or inorganic compounds having active hydrogen by reaction with the active hydrogen, can be used in the present invention. The silylating agent may include, for instance, a chlorosilane compound, especially a chlorosilane compound of the formula $R^1_{4-n}SiCl_n$ wherein $R^1$ is an alkyl group or phenyl group and n is 1, 2 or 3, an alkoxysilane, especially an alkoxysilane of the formula: $(R^2O)_m$—Si—$R^3_{(4-m)}$ wherein $R^2$ is an alkyl group, $R^3$ is an alkyl group or phenyl group and m is 1, 2 or 3; and a disilazane compound, especially a hexaalkyl disilazane compound. Representative examples of the silylating agent are, for instance, a chlorosilane compound such as tert-butyldimethylchlorosilane, phenyltrichlorosilane or diphenyldichlorosilane, preferably a di or trichlorosilane compound; an alkoxysilane compound, preferably a di or trialkoxysilane such as phenyltriethoxysilane, isobutyltrimethoxysilane or diphenydimethoxysilane; and a silazane compound such as hexamethyldisilazane. Other silylating agents such as N,O-bis(trimethylsilyl)acetamide and N,N'-bis(trimethylsilyl)urea are also applicable to the present invention. The silylating agents may be used alone or in admixture thereof.

The silylating agent is used in an amount of 0.1 to 3 parts by weight, preferably 0.5 to 2 parts by weight, per 100 parts by weight of the rubber component.

The tread rubber composition of the present invention can contain additives for rubbers usually employed in the production of tires, for example, curing agent such as sulfur, curing accelerator, antioxidant, carbon black, softener, activator such as zinc oxide or stearic acid, and the like.

The rubber composition of the present invention can be prepared and cured in a usual manner.

The present invention is more specifically described and explained by means of the following examples wherein all parts are by weight. It is to be understood that the present invention is not limited to the examples.

EXAMPLE 1

Rubber compositions were prepared according to the recipes shown in Table 1, wherein ebonite powder was one having an average particle size of 80 µm, carbon black was N220, silylating agent was phenyltriethoxysilane (KBE103 made by Shin-Etsu Chemical Co., Ltd. ), cellulose powder was a chaff powder having an average particle size of 120 µm (trade mark "Sumicelluco", product of Sumitomo Bussan Kabushiki Kaisha), and the oil was used in an amount to provide rubber compositions having the same hardness.

No ebonite powder was incorporated into the composition of Run No. 1, and a cellulose powder was incorporated instead of the ebonite powder into the composition of Run No. 2.

There were prepared pneumatic tires having a size of 185/70R14 and having a tread made from the rubber compositions of Run Nos. 1 to 11. The characteristics on icy roads and abrasion resistance of the tires were evaluated as follows:

Characteristics on Ice

The tires were attached to a car. The car was run at 15 km/hour on an ice-covered road and braked, and the distance required for stopping the car was measured. The result was represented as an index of the reciprocal of the braking distance value measured to the result of the tire of Run No. 2 regarded as 100. The larger the index, the better the braking characteristics on ice.

Abrasion Resistance

The amount of abrasion of a tire tread was measured by a Lambourn abrasion tester. The result was represented by as an index to the result of the tire of Run No. 2 regarded as 100. The larger the index, the better the abrasion resistance. The value 78 is permissible.

TABLE 1

| Run No. | 1 | 2 | 3 | 4 | 5 | 6 | 7 | 8 | 9 | 10 | 11 |
|---|---|---|---|---|---|---|---|---|---|---|---|
| Ingredients (part) | | | | | | | | | | | |
| Natural rubber | 100 | 100 | 100 | 100 | 100 | 100 | 100 | 100 | 100 | 100 | 100 |
| Carbon black | 50 | 50 | 50 | 50 | 50 | 50 | 50 | 50 | 50 | 50 | 50 |
| Stearic acid | 2 | 2 | 2 | 2 | 2 | 2 | 2 | 2 | 2 | 2 | 2 |
| Zinc oxide | 4 | 4 | 4 | 4 | 4 | 4 | 4 | 4 | 4 | 4 | 4 |
| Sulfur | 1.5 | 1.5 | 1.5 | 1.5 | 1.5 | 1.5 | 1.5 | 1.5 | 1.5 | 1.5 | 1.5 |
| Curing accelerator | 0.75 | 0.75 | 0.75 | 0.75 | 0.75 | 0.75 | 0.75 | 0.75 | 0.75 | 0.75 | 0.75 |
| Oil | 5 | 10 | 6 | 8 | 11 | 17 | 6 | 8 | 10 | 17 | 11 |
| Ebonite powder | — | — | 3 | 7 | 15 | 30 | 3 | 7 | 15 | 30 | 15 |
| Cellulose powder | — | 10 | — | — | — | — | — | — | — | — | — |
| Silylating agent | — | — | — | — | — | — | 1 | 1 | 1 | 1 | 0.5 |
| Characteristics on ice | 90 | 100 | 104 | 109 | 126 | 130 | 108 | 112 | 130 | 133 | 128 |
| Abrasion resistance | 110 | 100 | 99 | 98 | 95 | 78 | 99 | 98 | 95 | 78 | 95 |

It can be seen from the results shown in Table 1 that the rubber compositions of Run Nos. 3 to 11 containing an ebonite powder have superior characteristics on icy roads as compared with the rubber compositions of Run Nos. 1 and 2, particularly the rubber composition containing a cellulose powder of Run No. 2 according to prior art, and that the characteristics on icy roads are increased with increasing the amount of the ebonite powder. The abrasion resistance is decreased with increasing the amount of the ebonite powder, but can be tolerated so long as the ebonite powder is used in an amount of at most 30 parts by weight per 100 parts by weight of the rubber component.

It can be also seen from comparison between the results of Run Nos. 3 to 6 and the results of Run Nos. 7 to 10 that the characteristics on icy roads are further increased by incorporating a silylating agent. Therefore, it is possible to improve the characteristics on icy roads while restraining the amount of ebonite powder, in other words, while restraining the decrease in abrasion resistance, by using the ebonite powder in combination with a silylating agent.

In addition to the ingredients used in the Examples, other ingredients can be used in the Examples as set forth in the specification to obtain substantially the same results.

What we claim is:

1. A rubber composition for a tire tread comprising a diene rubber component, 3 to 30 parts of an ebonite powder having an average particle size of not more than 100 μm and 0.1 to 3 parts of a silylating agent, said parts all being parts by weight per 100 parts by weight of said diene rubber component.

2. The composition of claim 1, wherein the amount of said ebonite powder is from 5 to 30 parts by weight per 100 parts by weight of said diene rubber component.

3. The composition of claim 1, wherein the amount of said ebonite powder is from 7 to 15 parts by weight per 100 parts by weight of said diene rubber component.

4. The composition of claim 1, wherein the amount of said silylating agent is from 0.5 to 2 parts by weight per 100 parts by weight of said diene rubber component.

5. The composition of claim 1, wherein said silylating agent is at least one member selected from the group consisting of a chlorosilane, an alkoxysilane and a silazane.

6. The composition of claim 1, wherein said diene rubber component is at least one member selected from the group consisting of natural rubber, butadiene rubber, isoprene rubber and styrene-butadiene rubber.

* * * * *